United States Patent [19]

Chartier et al.

[11] 3,717,272

[45] Feb. 20, 1973

[54] TAILGATE AUGER

[75] Inventors: Richard G. Chartier, Clyde; Robert C. Chaffee, Green, both of Kans.

[73] Assignee: Gilmore-Tatge Mfg. Co., Inc., Clay Center, Kans.

[22] Filed: Sept. 14, 1970

[21] Appl. No.: 71,962

[52] U.S. Cl. ............... 214/503, 198/64, 198/122, 214/83.32, 214/509
[51] Int. Cl. ............................................. B60p 1/04
[58] Field of Search ....214/17 D, 503, 508, 509, 521, 214/522, 83.26, 83.32; 198/64, 122

[56] References Cited

UNITED STATES PATENTS

| | | | |
|---|---|---|---|
| 2,751,097 | 6/1956 | Miller | 214/83.32 |
| 3,128,894 | 4/1964 | Nelson | 214/509 |
| 2,302,840 | 11/1942 | Chartrand | 214/83.26 |
| 2,574,792 | 11/1951 | Love | 214/83.26 |
| 3,098,555 | 7/1963 | Harriot | 198/122 |

*Primary Examiner*—Robert G. Sheridan
*Attorney*—Schmidt, Johnson, Hovey & Williams

[57] ABSTRACT

An auger for the box sides of a truck or wagon bed utilizes an open-top hopper positioned on the tailgate of the vehicle, an elevator assembly having one end thereof within the hopper, and structure mounting the assembly for swinging movement relative to the hopper. A prime mover is operably joined with the assembly in all positions of swinging movement. The assembly is comprised of first and second operably interconnected sections, the uppermost of which is movable from its operating position to a collapsed position to reduce the effective vertical dimensions of the assembly during the transport of the vehicle.

14 Claims, 6 Drawing Figures

PATENTED FEB 20 1973
3,717,272
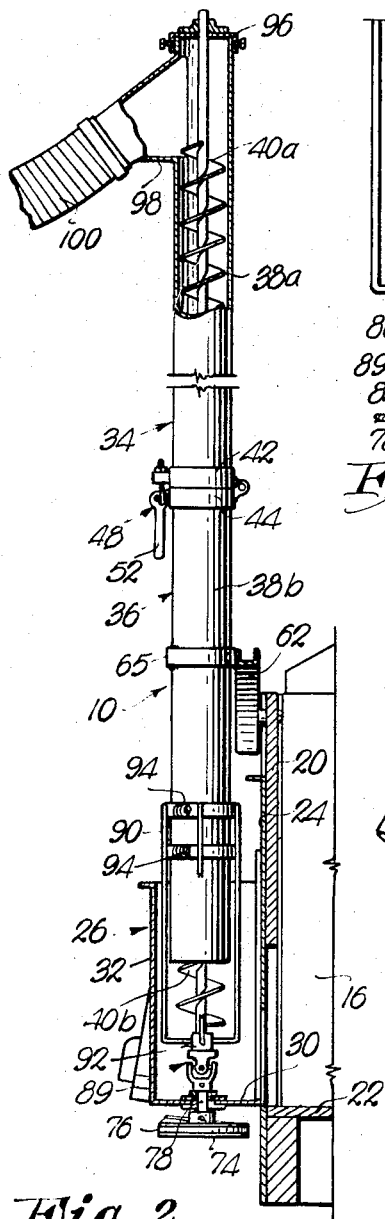
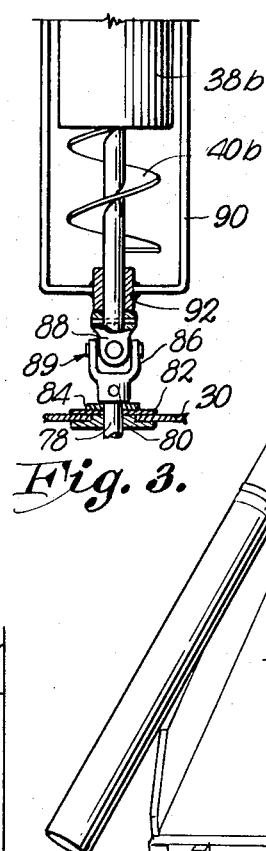
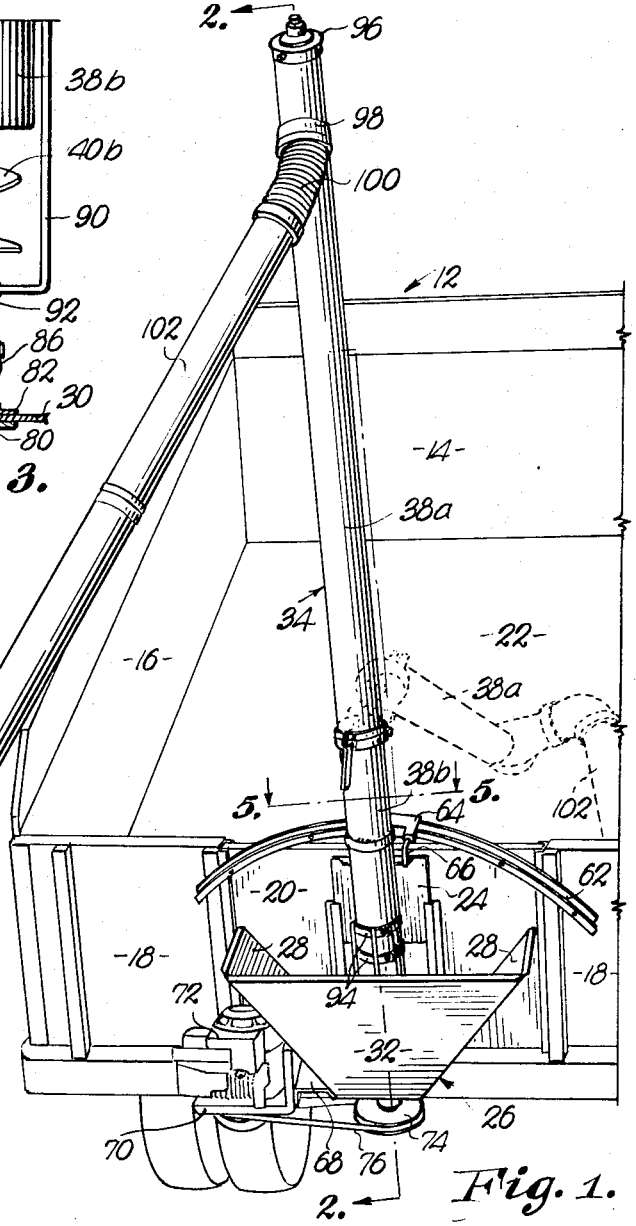
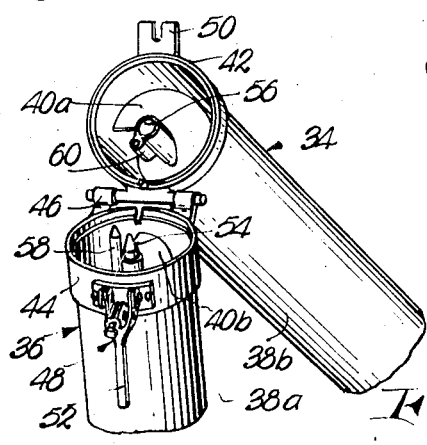
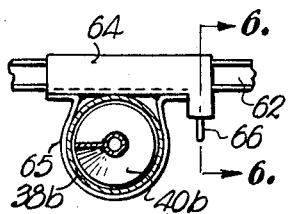
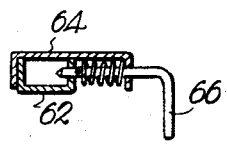
INVENTOR.
Richard G. Chartier
Robert C. Chaffee
BY Schmidt, Johnson, Hovey,
Williams & Chase
ATTORNEYS

TAILGATE AUGER

This invention relates to material-handling apparatus in the nature of a tailgate auger for tilt-bed trucks, trailers and other vehicles.

It is an object of the present invention to provide material-handling apparatus having structure for positioning a material-handling conveyor within a material-receiving hopper and, therefore, partly surrounded by the material to be elevated from the hopper for direct handling of the material without the need for expensive, heavy and complicated assemblies to convey the material from the hopper to the auger.

Another object of our instant invention is to provide for structure permitting lateral swinging of the auger assembly in the hopper so that the material may be raised and then unloaded on either of two sides of the truck body while, at the same time, keeping the inlet end of the auger-type elevator submerged in the material at all times.

Still another object of the invention is to provide material-handling apparatus as set forth in the above object which is driven by a prime mover located exteriorly of the hopper, thereby effecting space savings and locating the mover in a relatively dust-free area.

A further aim of the invention is to construct a material-handling apparatus having a conveyor positioned within a material-receiving hopper and laterally swingable relative thereto wherein the conveyor can also be collapsed into a folded position to reduce its effective height for transport of the apparatus.

In the drawing:

FIG. 1 is a perspective view of the material-handling apparatus of the invention mounted upon the tailgate of a tilted truck bed;

FIG. 2 is an enlarged, fragmentary vertical cross-sectional view taken along line 2—2 of FIG. 1;

FIG. 3 is an enlarged, fragmentary elevational view of the lower portion of the conveyor, illustrating details of the conveyor drive;

FIG. 4 is an enlarged, partial perspective view of the two conveyor sections of FIG. 1, with the uppermost section in its collapsed position relative to the lower section;

FIG. 5 is a fragmentary, substantially horizontal cross-sectional view taken along line 5—5 of FIG. 1; and FIG. 6 is an enlarged cross-sectional view taken along line 6—6 of FIG. 5.

Referring initially to FIGS. 1 and 2, the material-handling apparatus of the present invention is designated generally by the numeral 10 and is mounted upon a truck body designated generally by the numeral 12. The truck body 12 has a front wall 14, a pair of sidewalls, one of which is visible in FIG. 1 and designated by the numeral 16, and a tailgate 18 comprised of two spaced sections with a plate 20 slidably received therebetween. The walls 14, 16 and tailgate 18 are mounted upon a bed 22. The plate 20 is provided with a slidable door 24 which permits grain or other material within the truck body 12 to gravitate therefrom upon elevation of the forward end of the truck bed 22.

An open-top, material-receiving hopper 26 is secured to the plate 20 by welding or other appropriate means. The hopper 26 has a pair of opposed sloping sidewalls 28 which converge in a V-configuration toward a bottom wall 30. The normally vertical plate 20 of the tailgate 18, which plate 20 is parallel to a rear trapezoidal wall 32, also forms a wall of the hopper 26.

An auger-type elevator assembly comprising a pair of operably interconnected sections 34 and 36 is positioned with one end thereof within the hopper 26 and extends upwardly through the top of and beyond hopper 26. The elevator assembly includes a cylindrical tube which is divided into upper and lower sections 38a and 38b respectively, and an auger screw also divided into operably interconnected upper and lower sections 40a and 40b respectively.

Referring additionally to FIG. 4, a pair of sleeves 42 and 44 rigid to the tube sections 38a and 38b respectively support a hinge 46 which interconnects sections 38a and 38b. A releasable lock mechanism 48 includes a notched ear 50 rigid with the sleeve 42 and an over-center lock arm 52 rigid with the sleeve 44. The lowermost auger section 40b is provided with an aligning pin 54 which is received within an appropriate opening 56 in the shaft of the uppermost auger section 40a. An eccentric drive pin 58 rigid to the lowermost auger section 40b is received within a mating drive sleeve 60 rigid to the uppermost auger section 40a.

Structure for mounting the conveyor assembly for swinging movement within the hopper 26 is shown in detail in FIGS. 3, 5 and 6 and includes a generally arcuate track member 62 secured to plate 20 and a channel bar 64 slidably looped over track 62 for movement longitudinally therealong. A strap 65 fixed to channel bar 64 surrounds tube section 38b and is welded or otherwise secured thereto such that the conveyor assembly and bar 64 move as a unit along track 62. A lateral extension of the channel bar 64 provides a housing for a spring-biased locking pin 66 which is received within one of a plurality of openings in the track member 62, as best illustrated in FIG. 6.

A horizontally extending plate 68 rigidly affixed to one sidewall 28 of hopper 26 provides a mounting for an L-shaped platform 70 upon which a prime mover in the form of a gasoline engine 72 is positioned. The output shaft (not shown) of engine 72 is coupled with a pulley 74 through a belt 76. As illustrated in FIGS. 2 and 3, a shaft 78 which is keyed to the pulley 74 extends through an appropriate opening in the bottom 30 of the hopper 26, is surrounded by a bushing 80 and washers 82 and 84, and is centered between sidewalls 28 as shown in FIG. 1. It will be appreciated that in certain instances it may be desirable to include a conventional thrust bearing (not shown) in the bottom wall 30 in surrounding relationship to the shaft 78.

A first clevis 86 rigid with the shaft 78 is drivingly coupled with a second clevis 88 rigid to auger section 40b to form a universal joint 89 at the center point of the arc formed by track 62. An open-fingered frame or basket 90 is provided with a central bushing 92 at its base that abuts clevis 88 and rotatably receives the shaft of the auger screw section 40b, while the upper end of basket 90 has a pair of concentric rings 94 which snugly clasp about the lower tube section 38b to hold the latter in coaxial relationship with auger section 40b.

The upper end of the auger screw section 40a is journaled in a cap 96 which is removably secured to the end of the uppermost tube section 38a. A right-angle section 98 is integral with the tube section 38a and provides an outlet from the elevator assembly. The section 98 is joined with a flexible coupling 100 which, in turn, is joined with a delivery conduit 102.

In operation, when material is to be removed from the truck body 12, the bed will normally be raised at its front end to cause material to gravitate through the opening presented when the door 24 is raised. The engine 72 is operated to rotate the shaft 78 and the auger sections 40a and 40b through an axis intersecting the axis of swinging movement of the assembly.

It is particularly noteworthy to point out that the universal joint 89 maintains the drive coupling between the shaft 78 and the lower auger section 40b in all positions of swinging movement of the elevator from one of the sides 26 of the hopper 24 to the other. This operable coupling is always properly maintained since the track 62 is concentric with the universal joint 89; therefore, the assembly sections 34 and 36 are swingable from side to side without movement of the shaft 78. Further, this assures that the belt 68 always remains taut so as to maintain a constant, even driving force. Moreover, the weight of the sections 38a and 38b is carried by the track member 62 to avoid undue thrust on the joint 89, while the flexible coupling 100 provides further maneuverability for the apparatus 10 by permitting universal movement of the delivery tube 102.

Depending upon the circumstances, it may be desirable to periodically lock the assembly in one position relative to the hopper 26 while material is removed from the truck body 12, or it may be necessary to constantly swing the assembly from side to side during the unloading operation. In either case, it will be appreciated that the swingable nature of the assembly relative to the hopper permits a more even filling of barges, freight cars, or grain bins. The swinging movement of the assembly is also advantageous in reaching otherwise inaccessible areas.

Of particular advantage in the present invention is the placement of one end of the auger completely within the hopper 26. This provides for a very compact arrangement and also permits direct drive of the lower auger section 40b through the bottom of the hopper 26 without the need for bevel gears or the like. On the other hand, it is to be noted that the engine 72 is protected from dust and grain particles by virtue of its location outside of the hopper 26. Since the entire elevator assembly, the hopper 26, an engine 72 are completely supported by the plate 20, the apparatus of the invention may be quickly and easily removed from the truck body 12 to permit other uses of the truck.

When the truck is ready for over-the-road travel, it may be desirable to reduce the vertical height of the conveyor assembly. This is quickly accomplished by releasing the lock mechanism 48 and swinging the uppermost section 34 into the collapsed position illustrated in phantom in FIG. 1.

Having thus described the invention, what is claimed as new and desired to be secured by Letters Patent is:

1. In combination with a vehicle having a tiltable, material carrying body provided with a bed and an upstanding tailgate on the bed having a discharge aperture, an unloader comprising:
an open top, closed bottom, hopper on the tailgate exteriorly of the body disposed to receive and collect material from the body flowing through said aperture when the body is tilted;
an elevator assembly having a lower end within the hopper and extending upwardly through said top beyond the latter,
said assembly including a tube and an auger rotatable in the tube;
an upright shaft supported by the bottom of the hopper for rotation in a common plane with said auger,
said shaft having an inner end within the hopper and an outer end outside of the hopper;
a prime mover disposed externally of the hopper and coupled with said outer end of the shaft for driving the latter; and
a coupling in said hopper drivingly and pivotally interconnecting said inner end of the shaft and the auger for swinging of the assembly within said plane about an axis intersecting the plane while said auger is rotated.

2. The invention of claim 1, said hopper having a pair of sloping sides converging toward said bottom, said assembly swinging from one of said sides to the other of said sides.

3. The invention of claim 2, said shaft being centered with respect to said sides, said axis of swinging movement of the assembly extending through said aperture.

4. The invention of claim 1; and a frame attaching said tube to a portion of said coupling for maintaining the tube and the auger in concentric relationship.

5. The invention of claim 1,
said axis of swinging movement of the assembly extending through said aperture.

6. The invention of claim 1,
said hopper having a wall removably mounted on said tailgate and containing said aperture,
said prime mover being mounted on the hopper whereby the entire unloader, including the hopper, elevator assembly and the prime mover, may be treated as a unit and removed from or replaced on the vehicle at will.

7. The invention of claim 6; and
means on said wall restricting swinging of the assembly to said plane.

8. The invention of claim 7,
said assembly restricting means including an arcuate track concentric with the axis of swinging movement of the assembly, and an element mountable along the track and coupled with the assembly.

9. For use with a vehicle having a tiltable material-carrying body provided with a bed and an upstanding tailgate on the bed having an opening, a self-contained unloader removably mountable on the tailgate comprising:
an open top, closed bottom hopper having a wall adapted for removable disposition across said opening with the hopper disposed outside of the body,
said wall having an aperture for discharging material into the hopper for collection thereby when the unloader is mounted on the tailgate and the body is tilted;
an upstanding material elevator mounted in the hopper with its upper end extending beyond the top of the hopper;

a power device drivingly coupled with the elevator and carried by the hopper, whereby the entire unloader, including the hopper, the elevator and the power device, may be treated as a unit and removed from or replaced on the vehicle at will, said elevator including a rotatable auger;

an upright shaft driven by said device and supported by the bottom of the hopper for rotation in a common plane with the auger; and a coupling in the hopper pivotally and drivingly interconnecting the shaft and the auger for swinging of the elevator within said plane about an axis intersecting the plane during operation of the auger.

10. The invention as claimed in claim 9, said device being mounted externally of the hopper, said shaft having an inner end within the hopper coupled with the auger and an outer end outside of the hopper coupled with the device.

11. The invention as claimed in claim 9; and means on said wall of the hopper restricting swinging of the elevator to said plane.

12. The invention as claimed in claim 11, said elevator restricting means including an arcuate track concentric with said axis of swinging of the elevator, and an element movable along the track and coupled with the elevator.

13. In a material transporter and unloader:

a tiltable material-carrying body having a bed and a plurality of upstanding walls on the bed;

an open top, closed bottom material-receiving hopper outside the body on one of said walls, said one wall having a material discharge aperture therein communicating the hopper with the body such that, when the body is tilted in a manner to dispose said one wall lower than the other walls of the body, material flows along the bed toward said one wall, through said aperture and into the hopper for collection by the latter;

an upstanding elevator mounted in the hopper with its upper end extending beyond the top of the hopper for conveying material out of the hopper as it collects therein to thereby unload the body, said elevator including a rotatable auger;

an upright driven shaft supported by the bottom of the hopper for rotation in a common plane with the auger; and a coupling in the hopper drivingly and pivotally interconnecting the shaft and the auger for swinging of the elevator within said plane about an axis intersecting the plane.

14. The invention as claimed in claim 13, said hopper having a pair of opposed, downwardly sloping sidewalls converging as the bottom of the hopper and said shaft are approached, said shaft being substantially centered with respect to side sidewalls.

* * * * *